US012730608B2

(12) United States Patent
Tanaka

(10) Patent No.: US 12,730,608 B2
(45) Date of Patent: Sep. 8, 2026

(54) METHOD FOR GRAPHING COMPLEX FUNCTION, PROGRAM STORAGE MEDIUM, AND INFORMATION PROCESSING APPARATUS

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1174 days.

(21) Appl. No.: 17/680,606

(22) Filed: Feb. 25, 2022

(65) Prior Publication Data

US 2022/0308832 A1 Sep. 29, 2022

(30) Foreign Application Priority Data

Mar. 24, 2021 (JP) ................................ 2021-050733

(51) Int. Cl.
*G06F 7/48* (2006.01)
*G06F 3/04815* (2022.01)

(52) U.S. Cl.
CPC ........ *G06F 7/4806* (2013.01); *G06F 3/04815* (2013.01)

(58) Field of Classification Search
CPC ....... G06F 7/4806; G06F 3/048–04897; G06F 15/02–0291
USPC .......................................................... 708/130
See application file for complete search history.

(56) References Cited

FOREIGN PATENT DOCUMENTS

JP 2015204007 A 11/2015

OTHER PUBLICATIONS

W.O. Galitz, The Essential Guide to User Interface Design, An Introduction to GUI Design Principles and Techniques, Wiley Computer Publishing, Second Edition, 2002 (Year: 2002).*
A. M. d'Azevedo Breda et al., Complex Functions with Geogebra, Teaching Mathematics and its Applications, 35. hrw010.10.1093/teamat/hrw010, 2016 (Year: 2016).*
14. C.P. Lopez, Matlab Differential Equations, Practical Hands-On Matlab Solutions, Springer Apress, 2014 (Year: 2014).*
15. R. Liebo, Visualization of Complex Function Graphs in Augmented Reality, Masters Thesis, Vienna University of Technology, 2006 (Year: 2006).*

(Continued)

*Primary Examiner* — Emily E Larocque
(74) *Attorney, Agent, or Firm* — Holtz, Holtz & Volek PC

(57) ABSTRACT

A computer performs generating, on the basis of mathematical expression information indicating a complex function, first display information on a first three-dimensional graph that indicates a relationship between a first variable indicating a real part of a first complex number input to the complex function indicated by the mathematical expression information, a second variable indicating an imaginary part of the first complex number, and a third variable indicating a real part of a second complex number output from the complex function, generating, on the basis of the mathematical expression information, second display information on a second three-dimensional graph that indicates a relationship between the first variable, the second variable, and a fourth variable indicating an imaginary part of the second complex number, and outputting display information including the first display information and the second display information.

6 Claims, 6 Drawing Sheets

(56) References Cited

OTHER PUBLICATIONS

D.A. Patterson et. al., Computer Organization and Design: The Hardware/Software Interface, Elseveir Science & Technology, ch 1, 2007 (Year: 2007).*
https://www.geogebra.org/m/XUv5mXTm#material/vuha7few.

* cited by examiner

Paper1
F1
w = 1/z
G1
4
2
u,v
3
y w = 1/z
MATHEMATICAL EXPRESSION INFORMATION (w=1/z)
MATHEMATICAL EXPRESSION PROCESSING ENGINE
E
REAL PART u =x/(x²+y²)
IMAGINARY PART v =−y/(x²+y²)
2
u
x
y
COMPOSITE THREE-DIMENSIONAL GRAPH
4
u,v
3
v
FIRST THREE-DIMENSIONAL GRAPH
SECOND THREE-DIMENSIONAL GRAPH

METHOD FOR GRAPHING COMPLEX FUNCTION, PROGRAM STORAGE MEDIUM, AND INFORMATION PROCESSING APPARATUS

BACKGROUND OF THE INVENTION

Field of the Invention

The disclosure herein relates to a method for graphing a complex function, a program storage medium, and an information processing apparatus.

Related Art

In recent years, information and communication technology (ICT) devices have been introduced into school education. With this, a variety of learning applications running on computers have been actively developed.

For example, an application for mathematics shown at www.geogebra.org can be used to display graphs of various functions.

SUMMARY OF THE INVENTION

In a method for graphing a complex function according to one aspect of the present invention, a computer performs: generating, on the basis of mathematical expression information indicating the complex function, first display information on a first three-dimensional graph that indicates a relationship between a first variable indicating a real part of a first complex number input to the complex function indicated by the mathematical expression information, a second variable indicating an imaginary part of the first complex number, and a third variable indicating a real part of a second complex number output from the complex function; generating, on the basis of the mathematical expression information, second display information on a second three-dimensional graph that indicates a relationship between the first variable, the second variable, and a fourth variable indicating an imaginary part of the second complex number; and outputting display information including the first display information and the second display information.

DETAILED DESCRIPTION OF THE INVENTION

Figure 1:
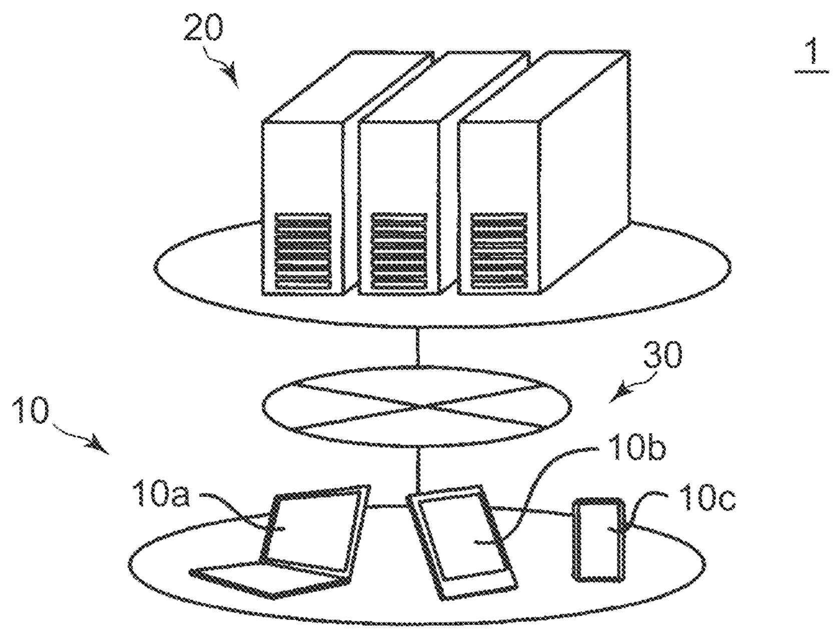
FIG. 1 is a diagram illustrating a configuration of a system 1.
Figure 2:
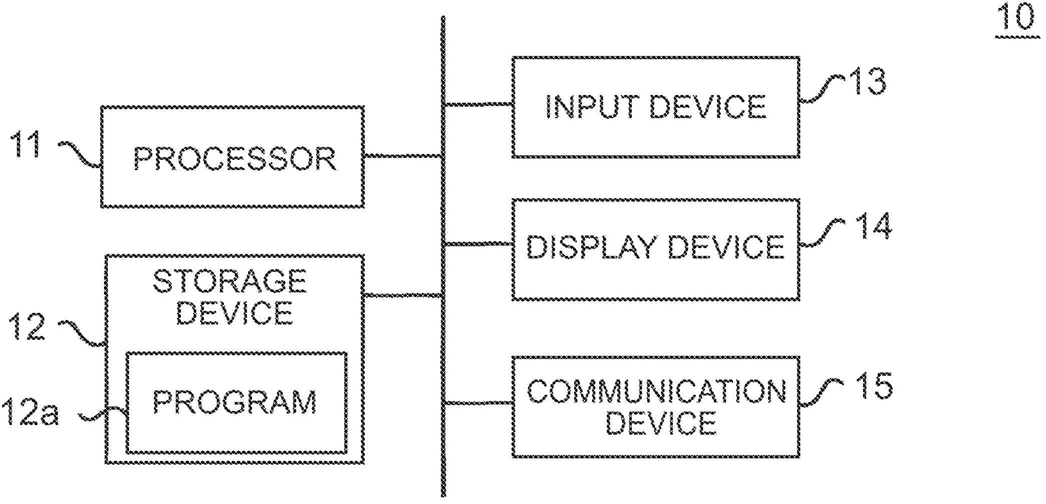
FIG. 2 is a block diagram illustrating a physical configuration of a client terminal 10.
Figure 3:
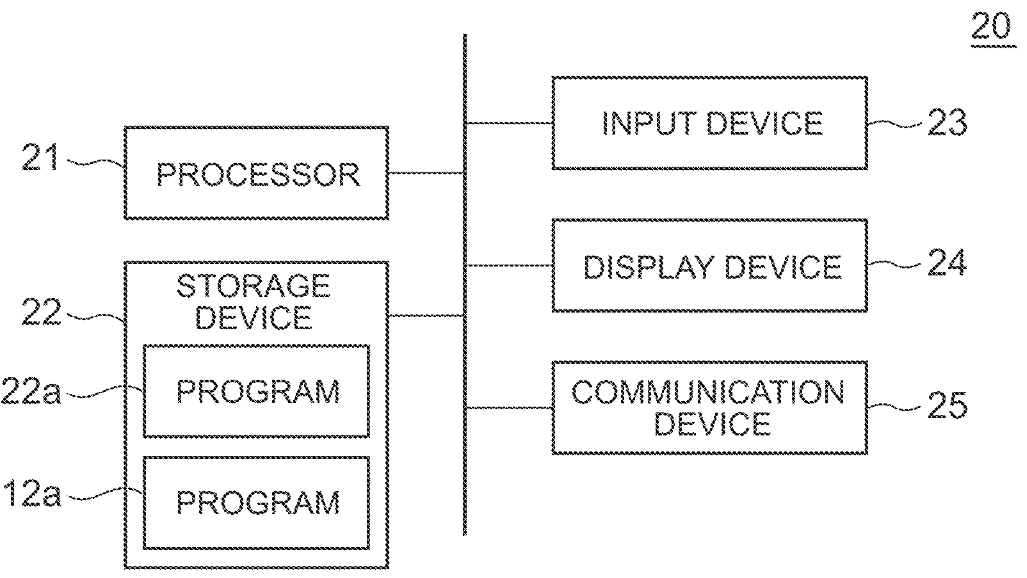
FIG. 3 is a block diagram illustrating a physical configuration of a server device 20.

FIG. 1 is a diagram illustrating a configuration of a system 1. FIG. 2 is a block diagram illustrating a physical configuration of a client terminal 10. FIG. 3 is a block diagram illustrating a physical configuration of a server device 20. The configuration of the system 1 will be described with reference to FIGS. 1 to 3.

The system 1 is, for example, a system for performing various mathematical operations in response to input from a user and displaying the results of the operations using graphs, mathematical tables, and the like, and in particular has a function of graphically displaying a complex function. As shown in FIG. 1, the system 1 includes a client terminal 10 and a server device 20, which are connected via a network 30. The network 30 is, for example, the Internet.

The client terminal 10 is an information processing apparatus equipped with a display device, and is manipulated by a user of the system 1. The client terminal 10, for example, transmits a request to the server device 20 in response to the user's input, and displays various information on an application screen on the basis of the response from the server device 20 to the request.

The client terminal 10, as shown in FIG. 1, may be a notebook computer 10*a*, a tablet computer 10*b*, or a smartphone-type computer 10*c*. The client terminal 10 is not limited to mobile terminals, but may be, for example, a desktop computer.

The client terminal 10 includes, without limitation, a processor 11, a storage device 12, an input device 13, a display device 14, and a communication device 15, for example, as shown in FIG. 2.

The processor 11 is an electric circuit including, for example, a central processing unit (CPU) and the like, and executes a program 12*a* stored in the storage device 12. The processor 11 may include a graphics processing unit (GPU), an application specific integrated circuit (ASIC), a field-programmable gate array (FPGA), a digital signal processor (DSP), and the like.

The storage device 12 is, for example, any semiconductor memory, and includes a random access memory (RAM) or other volatile memory, and a read only memory (ROM), flash memory, or other non-volatile memory. The storage device 12 may also include a magnetic storage device, an optical storage device, or any other type of storage device. The storage device 12 stores the program 12*a* that is executed by the processor 11. The program 12*a* stored in the storage device 12 may be, for example, an application program downloaded from the server device 20 via the network 30 and the communication device 15.

The input device 13 includes, for example, a keyboard, a mouse, a touch panel, and the like, but may also include an audio input device such as a microphone, and may include other types of input devices. The display device 14 is an example of a display unit of the client terminal 10, and is, for example, a liquid crystal display, an organic EL display, a plasma display, a CRT display, or the like. The communication device 15 is, for example, a wireless communication device such as a Wi-Fi (registered trademark) module, although it may be a wired communication device.

The server device 20 is an information processing apparatus that processes requests from the client terminal 10 and transmits the processing results to the client terminal 10. The server device 20 may be configured as a single device, or may be a set of a plurality of devices including, for example, a web server device, an application server device, a database server device, and the like. The server device 20 may also be configured as a distributed computing system.

The server device 20 includes, without limitation, a processor 21, a storage device 22, an input device 23, a display device 24, and a communication device 25, for example, as shown in FIG. 3.

The processor 21 is an electric circuit including, for example, a central processing unit (CPU) and the like, and executes a program 22*a* stored in the storage device 22. The processor 21 may include a graphics processing unit (GPU), an application specific integrated circuit (ASIC), a field-programmable gate array (FPGA), a digital signal processor (DSP), and the like.

The storage device 22 is, for example, any semiconductor memory, and includes a random access memory (RAM) or other volatile memory, and a read only memory (ROM), flash memory, or other non-volatile memory. The storage device 22 may also include a magnetic storage device, an optical storage device, or any other type of storage device. The storage device 22 stores the program 22*a* that is executed by the processor 21. The storage device 22 may also store a program 12*a* that is distributed to and executed in a client terminal 10.

The input device 23 includes, for example, a keyboard, a mouse, a touch panel, and the like, but may also include an audio input device such as a microphone, and may include other types of input devices. The display device 24 is an example of a display unit of the server device 20, and is, for example, a liquid crystal display, an organic EL display, a plasma display, a CRT display, or the like. The communication device 25 may be a wireless or wired communication device.

In the system 1 configured as described above, a user first starts a web browser installed on the client terminal 10 and inputs a predetermined URL. This causes the client terminal 10 to download the program 12*a* distributed by the server device 20 to the storage device 12 and execute the program. The program 12*a* is, for example, an application program that runs on the web browser. Thereafter, the user performs various manipulations on an application screen that is displayed on the web browser with the program 12*a* executed, whereby the client terminal 10 transmits a request to the server device 20 and further updates the application screen on the basis of the response from the server device 20.

Specifically, for example, as the user inputs a mathematical expression on the application screen, the client terminal 10 transmits the mathematical expression information to the server device 20 and requests graphing of the function represented by the mathematical expression. The server device 20 performs a mathematical operation on the basis of the request and transmits a response including information for displaying a graph of the function to the client terminal 10. In response, the client terminal 10 displays the graph of the function on the application screen.

Figure 4:
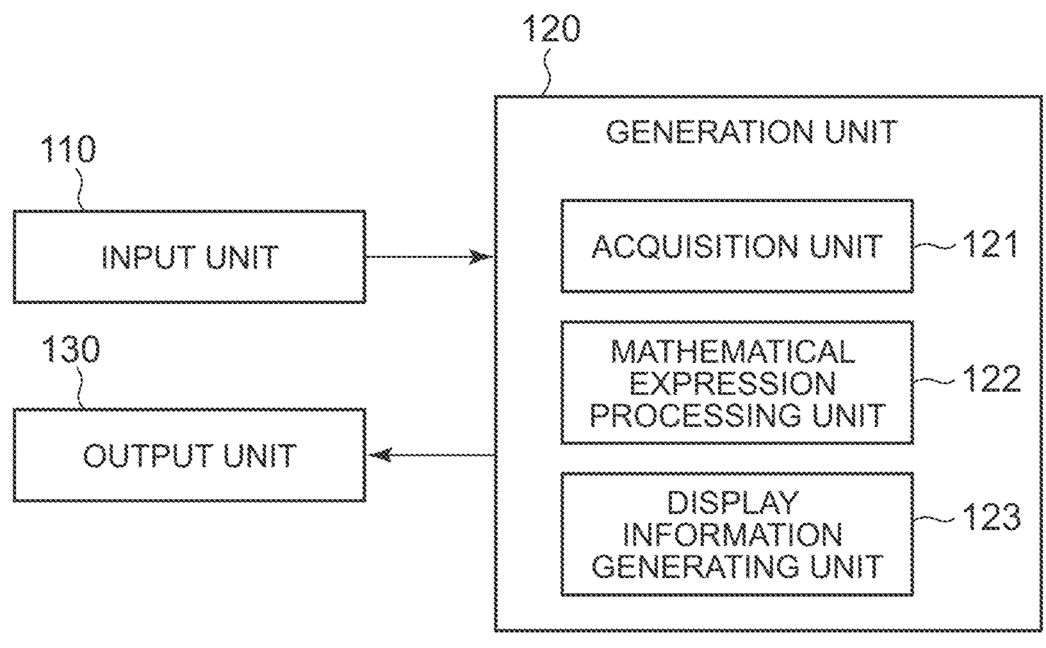
FIG. 4 is a block diagram illustrating a functional configuration of the server device 20.
Figure 5:
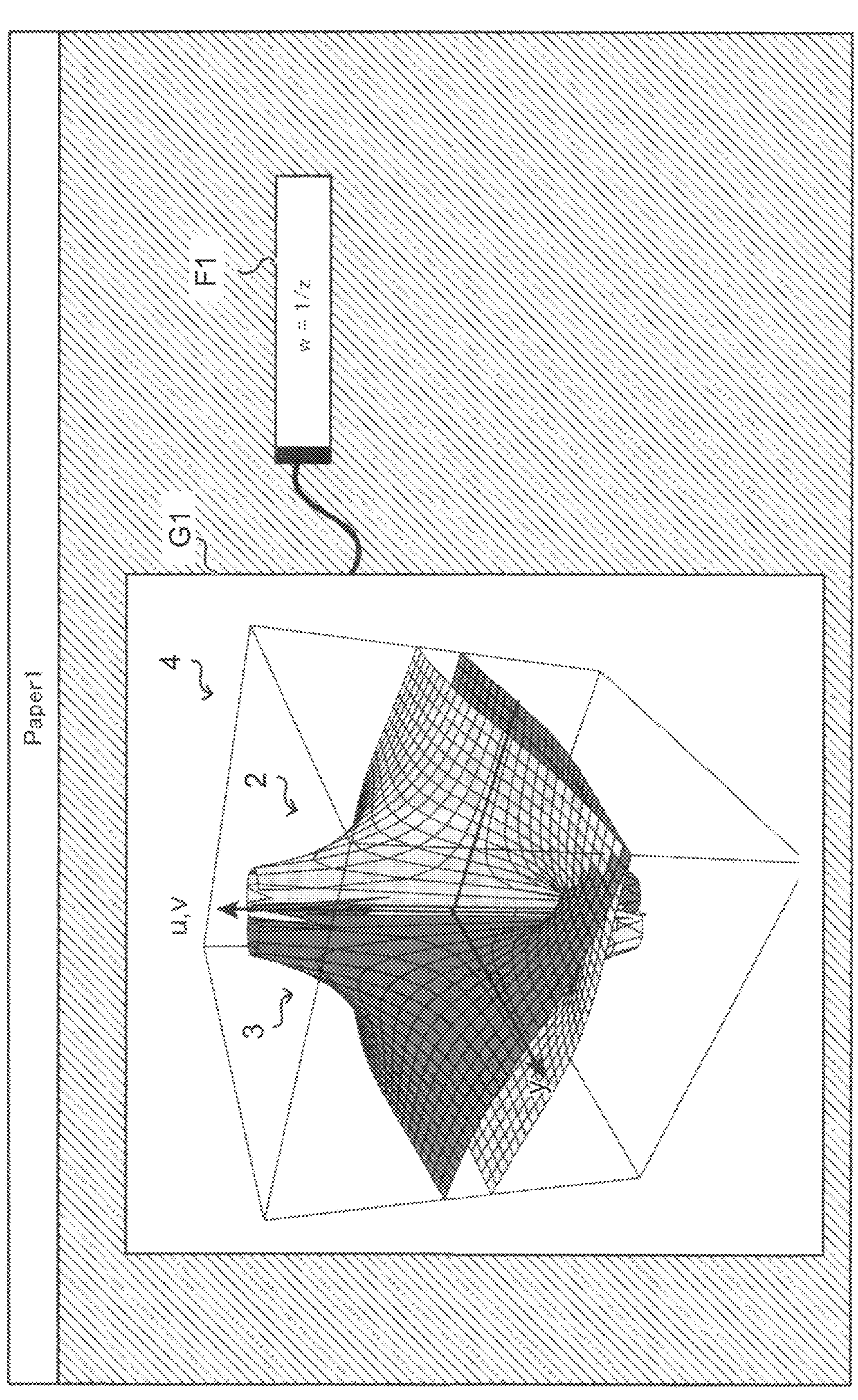
FIG. 5 is a diagram showing an example of an application screen displayed on the client terminal 10.

FIG. 4 is a block diagram illustrating a functional configuration of the server device 20. FIG. 5 is a diagram illustrating an example of an application screen displayed on the client terminal 10. The function of graphing a complex function will now be described with reference to FIGS. 4 and 5.

The server device 20, as shown in FIG. 4, includes an input unit 110, a generation unit 120, and an output unit 130. The generation unit 120 includes an acquisition unit 121, a mathematical expression processing unit 122, and a display information generating unit 123. It should be noted that the server device 20 may include a functional unit different from those shown in FIG. 4.

The input unit 110 receives a request including mathematical expression information from the client terminal 10. The input unit 110 is implemented, for example, by the communication device 25. In the case where the server device 20 is to graph a complex function, the mathematical expression information includes information on the mathematical expression of the complex function.

The generation unit 120, on the basis of the mathematical expression information indicating the complex function, generates display information causing a graph of the complex function to be displayed on the display device 14. More specifically, on the basis of the mathematical expression information indicating the complex function, the generation unit 120 generates the display information that causes two three-dimensional graphs (a first three-dimensional graph and a second three-dimensional graph) to be displayed on the display device 14. The generation unit 120 is implemented, for example, as the program 22*a* stored in the storage device 22 is executed by the processor 21.

In the generation unit 120, the acquisition unit 121 acquires the mathematical expression information included in the request, the mathematical expression processing unit 122 performs mathematical operation processing on the mathematical expression information, and the display information generating unit 123 generates the display information on the basis of the operation results.

The acquisition unit 121 acquires, as the mathematical expression information, information that is input to an input area of a first graphical user interface (GUI) component displayed on the display device 14 of the client terminal 10. The first GUI component may be a GUI component that imitates a tag (e.g., a sticky note) whose drawing position on the display device 14 can be adjusted. For example, the first GUI component is a mathematical expression tag F1 shown in FIG. 5.

The mathematical expression processing unit 122 divides the complex function indicated by the mathematical expression information acquired by the acquisition unit 121 into a function (hereinafter, referred to as real part function) that indicates a real part of a complex number that is an output from the complex function and a function (hereinafter, referred to as imaginary part function) that indicates an imaginary part of the complex number as the output from the complex function.

The real part function is a function that returns a real part of a complex function in response to an input of a complex number. That is, it can be expressed by a total of three variables that correspond to: the real and imaginary parts of the complex number input to the complex function and a real part output from the complex function. Accordingly, the real part function can be represented by a three-dimensional graph. The imaginary part function is a function that returns an imaginary part of a complex function in response to an input of a complex number. That is, it can be expressed by a total of three variables that correspond to: the real and imaginary parts of the complex number input to the complex function and an imaginary part output from the complex function. Accordingly, the imaginary part function can be represented by a three-dimensional graph, similarly as the real part function.

The display information generating unit 123, on the basis of the real part function and the imaginary part function obtained by the mathematical expression processing unit 122, generates display information that causes two three-dimensional graphs to be displayed on the display device 14. It should be noted that one of the two three-dimensional graphs is the first three-dimensional graph that graphs the real part function, which indicates the relationship between a first variable, indicating the real part of the complex number (first complex number) that is input to the complex function, a second variable, indicating an imaginary part of the first complex number, and a third variable, indicating the real part of the complex number (second complex number) that is output from the complex function. The other of the two three-dimensional graphs is the second three-dimensional graph that graphs the imaginary part function, which indicates the relationship between the first variable, indicating the real part of the complex number (first complex number) input to the complex function, the second variable, indicating the imaginary part of the first complex number, and a fourth variable, indicating the imaginary part of the complex number (second complex number) output from the complex function.

That is, the generation unit 120 generates first display information on the first three-dimensional graph and second display information on the second three-dimensional graph on the basis of the mathematical expression information, and generates display information including the first display information and the second display information.

The output unit 130 outputs the display information generated by the generation unit 120. More specifically, the output unit 130 transmits a response including the display information to the client terminal 10. The output unit 130 is implemented, for example, by the communication device 25.

With the server device 20 configured as described above, a client terminal 10 receiving display information from the server device 20 can display, on the basis of the display information, a graph of a complex function (a three-dimensional graph 4 obtained by overlaying a three-dimensional graph 2 and a three-dimensional graph 3) on the display device 14, as shown in FIG. 5.

FIG. 5 shows a situation where a mathematical expression tag F1 and a graph tag G1 are displayed in a window W of the application. In an input area of the mathematical expression tag F1, which is the first GUI component, a mathematical expression indicating a complex function (w=1/z, where w and z are complex numbers) is displayed. In a graph drawing area of the graph tag G1, which is the second GUI component associated with the mathematical expression tag F1, a three-dimensional graph 2 showing the real part function and a three-dimensional graph 3 showing the imaginary part function are displayed, whereby one complex function is graphed as a three-dimensional graph 4. That is, the display information output from the server device 20 is information that causes the three-dimensional graph 2 and the three-dimensional graph 3 to be displayed within the graph drawing area of the graph tag G1 associated with the mathematical expression tag F1.

As such, according to the system 1, simply inputting a mathematical expression indicating a complex function allows graphs (two three-dimensional graphs) of the complex function to be displayed, which visualize the relationship between the four variables by assigning coordinate information to each of the four variables. Since the values of the variables can be read as the coordinate information from the graphs, the user can read the accurate information on the complex function from the displayed graphs.

Figure 6:
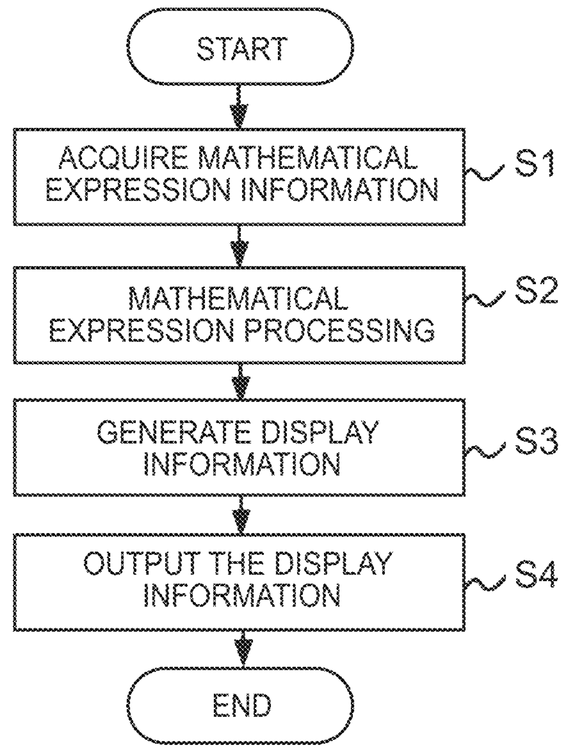
FIG. 6 is an exemplary flowchart of a complex function graphing process performed in the server device 20.
Figure 7:
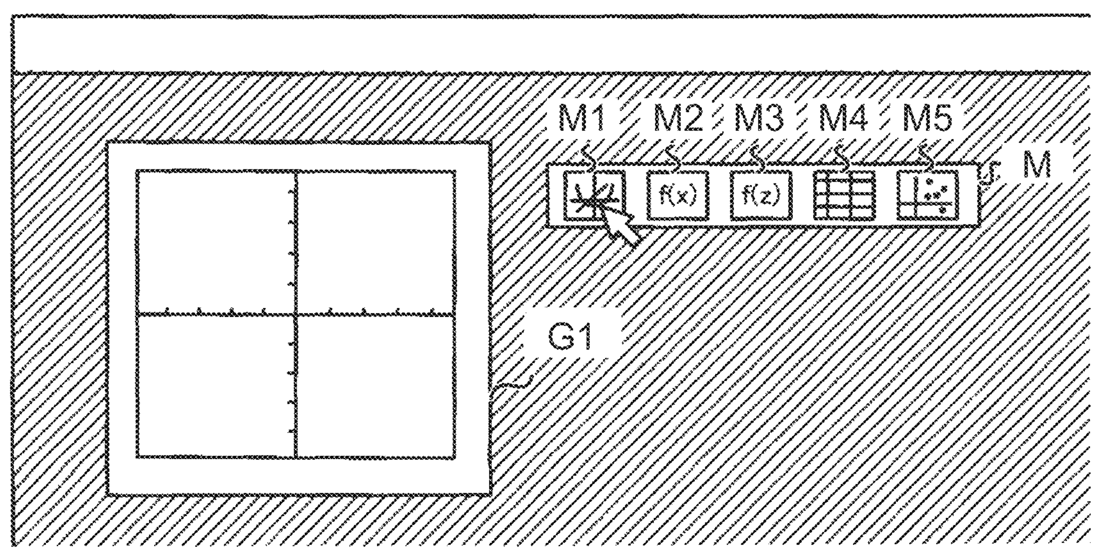
FIG. 7 is a diagram illustrating a procedure for creating a graph tag.
Figure 8:
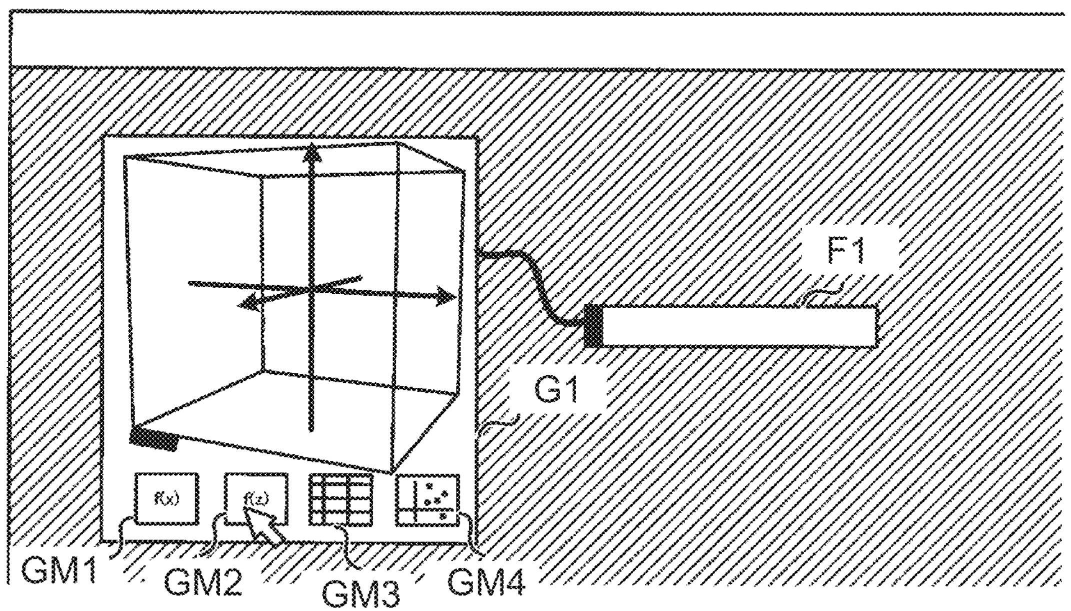
FIG. 8 is a diagram illustrating a procedure for creating a mathematical expression tag.
Figure 9:
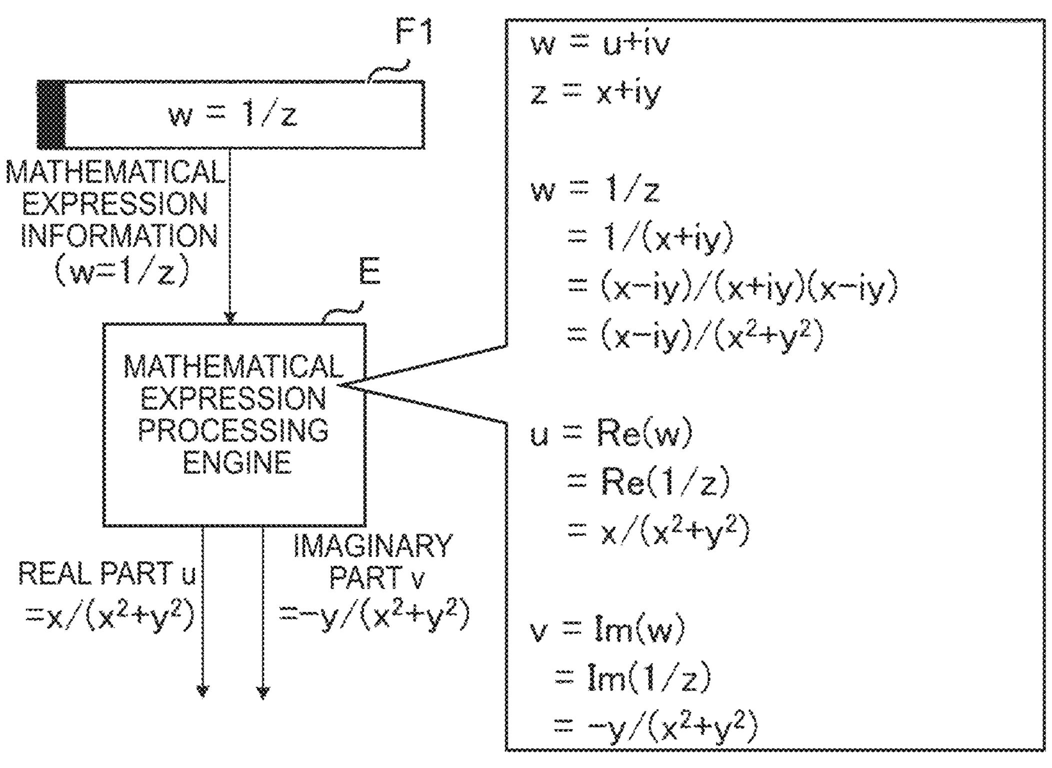
FIG. 9 is a diagram illustrating mathematical expression processing.
Figure 10:
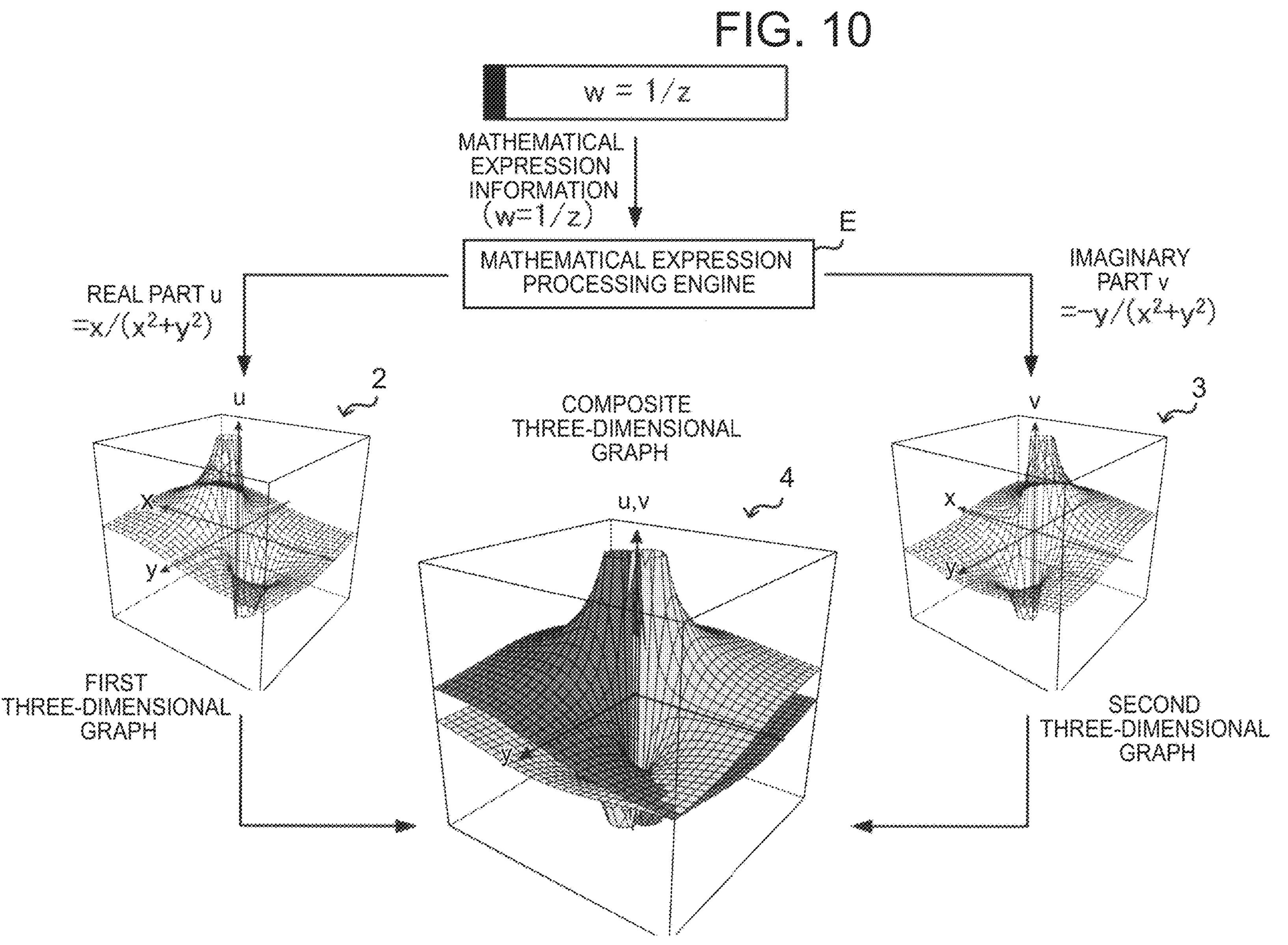
FIG. 10 is a diagram illustrating a procedure for generating display information.

FIG. 6 shows an exemplary flowchart of a process of graphing a complex function, which is performed by the server device 20. FIG. 7 is a diagram illustrating the procedure for creating a graph tag. FIG. 8 is a diagram illustrating the procedure for creating a mathematical expression tag. FIG. 9 is a diagram illustrating mathematical expression processing. FIG. 10 is a diagram illustrating the procedure for generating display information. The method of graphing a complex function will be explained in detail below with reference to FIGS. 6 to 10.

In the server device 20, for example, the processor 21 executes the program 22*a* to start the graphing process shown in FIG. 6. When the graphing process shown in FIG. 6 is started, the server device 20 acquires mathematical expression information (step S1).

Before the processing of step S1 is performed in the server device 20, the client terminal 10 performs the following processing by interacting with the server device 20. First, the client terminal 10 accesses a web application running on the server device 20 to display an application screen on the web browser. In this state, no tag object, such as the mathematical expression tag F1 or the graph tag G1 described above, is displayed on the screen.

Thereafter, when the user of the client terminal 10 presses an arbitrary area on the application screen, a menu list M shown in FIG. 7 is displayed. On the menu list M, for example, five menus M1 to M5 are listed. When the user presses the menu M1, a graph tag G1 is created and displayed on the application screen, as shown in FIG. 7. At this time, no graph is displayed on the graph tag G1, and only two axes are displayed for a two-dimensional graph.

Next, when the user presses the graph tag G1, a plurality of menus (menus GM1, GM2, GM3, GM4) are displayed on the graph tag G1. Each of the menus is for creating a different kind of tag object. When the user presses the menu GM2 located second from the left, a mathematical expression tag F1 for a complex function is created and displayed on the application screen in association with the graph tag G1, as shown in FIG. 8. At this time again, no graph is displayed on the graph tag G1, but three axes are displayed for a three-dimensional graph, instead of the two axes for a two-dimensional graph. It should be noted that the association between tag objects is expressed by displaying a line that connects the associated tag objects.

When the mathematical expression tag F1 is displayed and the user inputs a mathematical expression indicating a complex function in the mathematical expression tag F1, then in step S1, the communication device 25 receives the information input to the mathematical expression tag F1 from the client terminal 10, and the processor 21 acquires the received information as the mathematical expression information. In the following, the case where the mathematical expression w=1/z is input will be described by way of example. In the expression, w and z are complex variables.

When the mathematical expression information is acquired, the processor 21 performs mathematical expression processing on the mathematical expression information (step S2). Here, as shown in FIG. 9, a mathematical expression processing engine E constituting the processor 21 calculates a real part function ($u=x/(x^2+y^2)$) and an imaginary part function ($v=-y/(x^2+y^2)$) from the complex function indicated by the mathematical expression information (w=1/z). In the expressions, u and v are real and imaginary parts of the complex variable w, and x and y are real and imaginary parts of the complex variable z.

When the mathematical expression processing is completed, the processor 21 generates display information (step S3). Here, as shown in FIG. 10, the processor 21 generates a three-dimensional graph 2 of the real part function and a three-dimensional graph 3 of the imaginary part function. Further, the processor 21 creates a composite three-dimensional graph 4 by combining the three-dimensional graphs 2 and 3 in such a manner that the u axis (output axis) of the three-dimensional graph 2 coincides with the v axis (output axis) of the three-dimensional graph 3. By thus sharing one axis on a three-dimensional graph with the u and v axes, four variables can be expressed with three axes of the orthogonal coordinate system, together with the two axes to which the x and y axes are assigned, respectively. Therefore, two three-dimensional graphs can be overlaid and displayed within one orthogonal coordinate system, making it possible to easily grasp the relationship between the real and imaginary parts. Further, sharing the same axis between the u and v axes makes it also possible to easily grasp the size relationship between the real and imaginary parts.

The processor 21 creates information necessary for causing the thus created composite three-dimensional graph 4 to be displayed on the display device 14, as the display information. The display information may be, for example, information in an image format. However, the display information is not limited to the image format because it is sufficient if the program 12*a* of the client terminal 10 can restore the composite three-dimensional graph 4 therefrom. It may be information in a format other than the image format enabling restoration of the composite three-dimensional graph 4. In other words, the display information may only include first display information causing the first three-dimensional graph to be displayed on the display device 14 and second display information causing the second three-dimensional graph to be displayed on the display device 14. It should be noted that the first display information and the second display information may be separably included in the display information, or may be mixed together and inseparably included in the display information.

The display information is desirably information that causes the three-dimensional graph 2 and the three-dimensional graph 3 to be displayed in different colors on the display device 14, and the processor 21 desirably creates the display information as information that causes the two graphs to be displayed in different colors on the display device 14. This makes it possible to grasp at a glance the difference between the real part and the imaginary part when the three-dimensional graph 2 and the three-dimensional graph 3 are displayed on the basis of the display information.

When the generation of the display information is completed, the server device 20 outputs the display information (step S4). Here, for example, the communication device 25 transmits the display information to the client terminal 10. As a result, two three-dimensional graphs showing the complex function are displayed on the application screen, as shown in FIG. 5, whereby the process shown in FIG. 6 is completed.

The above-described embodiments are specific examples to facilitate understanding of the invention, and the present invention is not limited to these embodiments. It is to be appreciated that the present invention encompasses a number of types of variations and alternatives of the above-described embodiments. For example, it would be appreciated that each embodiment is able to be embodied by modifying the elements without departing from the scope and the gist of the embodiment. It would also be appreciated that various types of embodiments are able to be implemented by appropriately combining a plurality of the elements disclosed in the above-described embodiments. Further, those skilled in the art would appreciate that various types of embodiments are able to be implemented by deleting one or more elements out of all the elements described in the embodiments or adding one or more elements to the elements described in the embodiments. That is, the method for graphing a complex function, the program, and the information processing apparatus can be variously modified or altered without departing from the scope of the claims.

In the above-described embodiments, the case of providing a complex function graphing function as a web application has been shown. However, the manner of realizing such a function is not limited to the web application. The graph of the complex function may be displayed on the display device 24 of the server device 20, and the user may manipulate the input device 23 to input mathematical expression information to the server device 20. The output of the display information is not limited to that directed to the display device, and may be directed to other output devices, such as a printing device, for example. Further, the output of the display information is not limited to that directed to the output device, and may be directed to a storage device. The display information stored in the storage device may be read out at an arbitrary timing and displayed on the display device to allow the user to read the accurate information on the complex function.

In the above-described embodiments, the case of displaying two three-dimensional graphs on top of each other has been shown. However, the two three-dimensional graphs need not necessarily be displayed on top of each other. For example, they may be displayed side by side within the graph display area in the graph tag G1. Further, they may be displayed one by one in the graph display areas of two graph tags associated with each other. In this case as well, it is possible to ascertain the values of the variables from the coordinate information, and it is possible to read accurate information from the graphs of the complex function.

In the above-described embodiments, the case of creating two three-dimensional graphs using mathematical expression information acquired from a certain tag object and displaying the two three-dimensional graphs in another tag object associated with the certain tag object has been shown. In such a configuration, the tag objects are associated with each other by a line or the like, making it readily possible to grasp which mathematical expression (complex function) is visualized with the three-dimensional graphs. Further, the tag objects can be easily adjusted in their placement within the display area, which makes it possible to use them in school education, for example, where teachers can move the object that they want students to pay attention to, to a position where the students can easily see it. However, the GUI component that accepts input of mathematical expression information is not limited to a tag object, and the GUI component that displays two three-dimensional graphs is not limited to a tag object. Each of the GUI components may be a GUI component that is fixed in a certain area on the screen.

As used herein, the expression "on the basis of A" does not mean "on the basis of only A", but means "on the basis of at least A". That is, "on the basis of A" may mean on the basis of B in addition to A.

As used herein, the terms such as "first" and "second" that modify a noun do not limit the quantity or order of the element represented by the noun. These terms are used to distinguish between two or more elements, no less and no more. Thus, the identification of a "first" element and a "second" element does not imply that the "first" element precedes the "second" element, nor does it negate the existence of a "third" element.

What is claimed is:

1. A method for graphing a complex function, the method being performed by a computer communicably connected to a user terminal, and the method comprising:

receiving, from a user of the user terminal, input of mathematical expression information including the complex function;

generating, based on the mathematical expression information, first display information comprising image data formatted for display by the user terminal, the first display information comprising a first three-dimensional graph that indicates a relationship between a first variable indicating a real part of a first complex number input to the complex function indicated by the mathematical expression information, a second variable indicating an imaginary part of the first complex number, and a third variable indicating a real part of a second complex number output from the complex function;

generating, based on the mathematical expression information, second display information comprising image data formatted for display by the user terminal, the second display information comprising a second three-dimensional graph that indicates a relationship between the first variable, the second variable, and a fourth variable indicating an imaginary part of the second complex number;

combining the first three-dimensional graph and the second three-dimensional graph to generate composite image data formatted for display by the user terminal in which the first three-dimensional graph and the second three-dimensional graph are simultaneously displayed within one orthogonal coordinate system such that an axis corresponding to the third variable in the first three-dimensional graph coincides with an axis corresponding to the fourth variable in the second three-dimensional graph; and executing processing to display, on a display of the user terminal, display information including the composite image data.

2. The graphing method according to claim 1, wherein the combining generates the composite image data such that the first three-dimensional graph and the second three-dimensional graph are simultaneously displayed in different colors in the display information displayed on the display of the user terminal.

3. The graphing method according to claim 1, wherein the receiving comprises acquiring, as the mathematical expression information, information input by the user of the user terminal to an input area of a first graphical user interface (GUI) component displayed on the display of the user terminal, and wherein the combining generates the composite image data such that the first three-dimensional graph and the second three-dimensional graph are displayed in a graph drawing area of a second GUI component associated with the first GUI component.

4. The graphing method according to claim 3, wherein each of the first and second GUI components is a GUI component that imitates a tag whose drawing position on the display of the user terminal can be adjusted.

5. A non-transitory computer-readable medium storing a program thereon, the program causing a computer communicably connected to a user terminal to:

receive, from a user of the user terminal, input of mathematical expression information including the complex function;

generate, based on the mathematical expression information, first display information comprising image data formatted for display by the user terminal, the first display information comprising a first three-dimensional graph that indicates a relationship between a first variable indicating a real part of a first complex number input to the complex function indicated by the mathematical expression information, a second variable indicating an imaginary part of the first complex number, and a third variable indicating a real part of a second complex number output from the complex function;

generate, based on the mathematical expression information, second display information comprising image data formatted for display by the user terminal, the second display information comprising a second three-dimensional graph that indicates a relationship between the first variable, the second variable, and a fourth variable indicating an imaginary part of the second complex number;

combine the first three-dimensional graph and the second three-dimensional graph to generate composite image data formatted for display by the user terminal in which the first three-dimensional graph and the second three-dimensional graph are simultaneously displayed within one orthogonal coordinate system such that an axis corresponding to the third variable in the first three-dimensional graph coincides with an axis corresponding to the fourth variable in the second three-dimensional graph; and execute processing to display, on a display of the user terminal, display information including the composite image data.

6. An information processing apparatus comprising:

a memory storing a program thereon; and at least one hardware processor configured to, under control of the program stored in the memory:

receive, from a user of the user terminal, input of mathematical expression information including the complex function;

generate, based on the mathematical expression information, first display information comprising image data formatted for display by the user terminal, the first display information comprising a first three-dimensional graph that indicates a relationship between a first variable indicating a real part of a first complex number input to the complex function indicated by the mathematical expression information, a second variable indicating an imaginary part of the first complex number, and a third variable indicating a real part of a second complex number output from the complex function;

generate, based on the mathematical expression information, second display information comprising image data formatted for display by the user terminal, the second display information comprising a second three-dimensional graph that indicates a relationship between the first variable, the second variable, and a fourth variable indicating an imaginary part of the second complex number;

combine the first three-dimensional graph and the second three-dimensional graph to generate composite image data formatted for display by the user terminal in which the first three-dimensional graph and the second three-dimensional graph are simultaneously displayed within one orthogonal coordinate system such that an axis corresponding to the third variable in the first three-dimensional graph coincides with an axis corresponding to the fourth variable in the second three-dimensional graph; and execute processing to display, on a display of the user terminal, display information including the composite image data.

* * * * *